United States Patent
Kees et al.

(10) Patent No.: US 9,297,445 B2
(45) Date of Patent: Mar. 29, 2016

(54) METHOD FOR CONTROLLING AN ENGINE DRIVE BELT TENSIONER SYSTEM

(71) Applicant: Ford Global Technologies, LLC, Dearborn, MI (US)

(72) Inventors: Donatus Andreas Josephine Kees, Billericay (GB); Anthemios Philemon Petridis, Bishop's Stortford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 263 days.

(21) Appl. No.: 14/053,516

(22) Filed: Oct. 14, 2013

(65) Prior Publication Data

US 2014/0130635 A1 May 15, 2014

(30) Foreign Application Priority Data

Nov. 15, 2012 (GB) .................... 1220565.4

(51) Int. Cl.
| | |
|---|---|
| F02N 11/08 | (2006.01) |
| F16H 7/08 | (2006.01) |
| F02N 11/00 | (2006.01) |
| F02N 15/08 | (2006.01) |
| F02N 11/04 | (2006.01) |

(52) U.S. Cl.
CPC ............... *F16H 7/08* (2013.01); *F02N 11/006* (2013.01); *F02N 15/08* (2013.01); *F02N 11/04* (2013.01); *F02N 11/0814* (2013.01); *F16H 2007/0885* (2013.01); *Y10T 74/131* (2015.01)

(58) Field of Classification Search
CPC .... F01L 1/024; F02N 1/02; F02N 2300/2011; F02N 15/08; F16H 7/08; F16H 2007/0823; F16H 2007/0876; F16H 2007/0885
USPC ................ 123/179.4, 185.8, 179.28; 474/110
See application file for complete search history.

(56) References Cited

U.S. PATENT DOCUMENTS

| | | | | |
|---|---|---|---|---|
| 5,439,420 | A | * 8/1995 | Meckstroth et al. | F16H 7/08 474/133 |
| 7,217,206 | B2 | 5/2007 | Stone et al. | |
| 8,112,208 | B2 | 2/2012 | McGee et al. | |
| 8,141,534 | B2 | 3/2012 | Liu et al. | |
| 8,770,163 | B2 * | 7/2014 | Quincerot et al. | F02N 11/08 123/179.1 |
| 9,151,366 | B2 * | 10/2015 | Antchak | B60K 25/02 |
| 2011/0070985 | A1 | 3/2011 | Deneszczuk et al. | |
| 2011/0277728 | A1 | 11/2011 | Schoenek et al. | |
| 2013/0172137 | A1 * | 7/2013 | Antchak | B60K 25/02 474/133 |
| 2014/0309882 | A1 * | 10/2014 | Antchak | F02B 67/06 701/36 |
| 2015/0057117 | A1 * | 2/2015 | Antchak | F16H 7/1263 474/109 |
| 2015/0144099 | A1 * | 5/2015 | Straker | F02N 19/005 123/339.14 |
| 2015/0167796 | A1 * | 6/2015 | Noguchi | F16H 7/1281 477/3 |
| 2015/0167797 | A1 * | 6/2015 | Noguchi | F16H 7/1281 477/3 |

FOREIGN PATENT DOCUMENTS

| | | |
|---|---|---|
| JP | 2005291406 A | 10/2005 |
| WO | 2012031361 A1 | 3/2012 |

* cited by examiner

*Primary Examiner* — Hai Huynh
(74) *Attorney, Agent, or Firm* — Julia Voutyras; Alleman Hall McCoy Russell & Tuttle LLP

(57) ABSTRACT

Methods and systems are provided for controlling an engine drive belt tensioner system in which the engine is controlled by an engine stop-start system. When the engine stop-start system decides to stop the engine, the engine drive belt tensioner system is operated so as to increase the tension in a respective drive belt to a high level during the engine stop process. This reduces the time taken for the engine to stop and will tend to reduce any tendency for reverse rotation of the engine at the end of the stop phase.

12 Claims, 8 Drawing Sheets

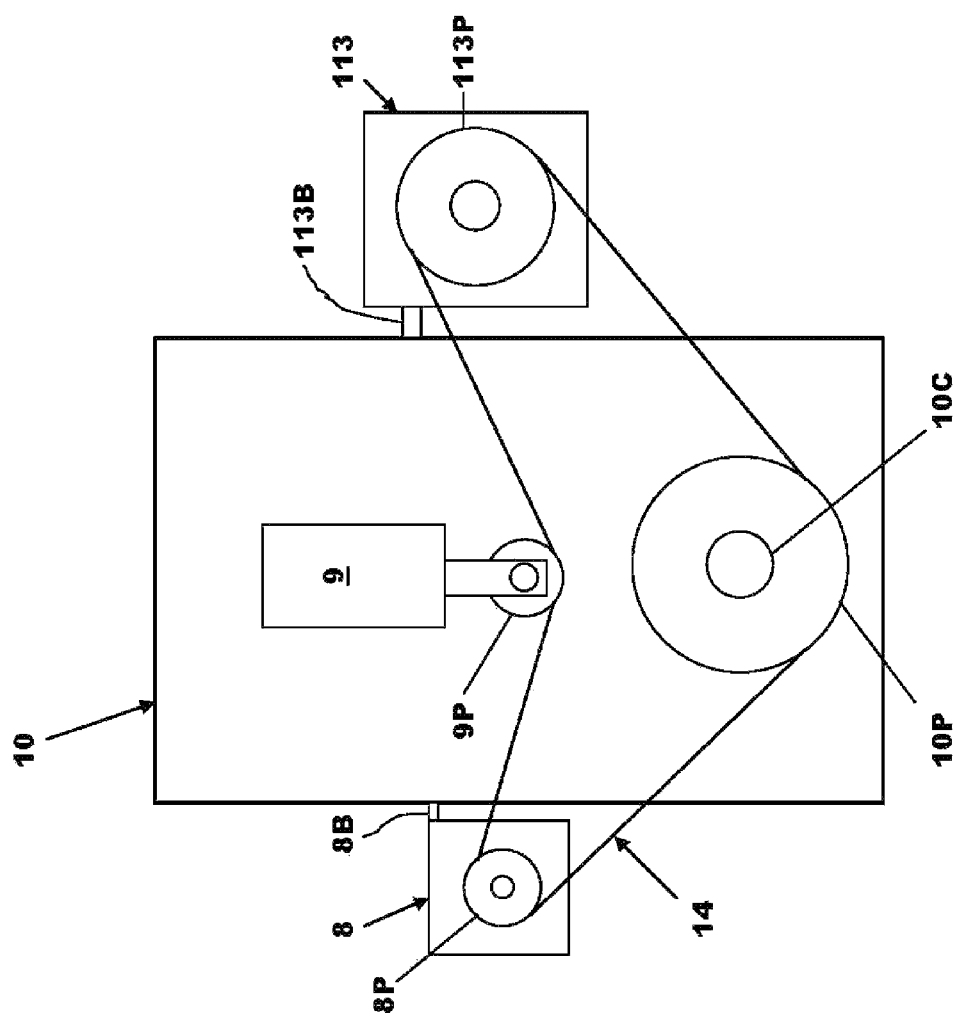

METHOD FOR CONTROLLING AN ENGINE DRIVE BELT TENSIONER SYSTEM

CROSS REFERENCE TO RELATED APPLICATIONS

The present application claims priority to Great Britain Patent Application No. 1220565.4, filed on Nov. 15, 2012, the entire contents of which are hereby incorporated by reference for all purposes.

FIELD

This invention relates to motor vehicles having an engine drive belt tensioner system and, in particular, to a method for controlling such an engine drive belt tensioner system.

BACKGROUND/SUMMARY

It is known to provide a motor vehicle with an engine stop-start system for automatically stopping and starting the engine whenever it is determined from driver actions that there is an opportunity to do so in order to reduce fuel consumption and reduce emissions from the engine. However, the inventors herein have recognized potential issues with such systems. In one example, an engine stop-start system that, if the time taken to restart the engine is excessive, may have a restart delay that may lead to dissatisfaction in a user of the motor vehicle. In addition such an excessive delay may also result in actual use problems if the driver wrongly concludes that the system has failed to restart the engine in response to their actions.

Specifically, engine stop-start systems rely on pinion engagement into the ring gear to deliver cranking torque to restart the engine. However, pinion engagement is prohibited if the engine is running because it results in severe damage to the pinion or the ring gear. To avoid damage, the pinion can only be safely engaged at an engine speed of typically 200 RPM or less. When an engine shut down is commanded by the driver this action cannot be reversed until the engine speed has fallen below the safe threshold. This time delay is defined by the rate of engine speed reduction and is extremely critical for customer satisfaction especially when there is a "change of mind scenario."

In one example, the issues described above may be addressed by a method for controlling an engine drive belt tensioner system of a motor vehicle, comprising controlling the drive belt tensioner system to increase the tension in an associated drive belt to a high belt tension while the engine is being stopped. The motor vehicle may have a stop-start system to automatically stop and start the engine in response to predefined driver actions and the method may comprise using the drive belt tensioner system to increase the tension in the drive belt towards the high belt tension when the actions of the driver indicate that the engine is to be stopped. The engine may be started by a starter motor driveably engageable with a ring gear fastened to a flywheel of the engine and the method may further comprise reducing the tension in the drive belt to a low belt tension to assist with engine starting.

In another example, an engine drive belt tensioner system comprises an actuator to vary the tension in an associated drive belt and a belt tension controller and the belt tension controller is operable to control the actuator so as to increase the tension in an associated drive belt to a high belt tension while the engine is being stopped. The motor vehicle may have a stop-start system to automatically stop and start the engine in response to predefined driver actions and the belt tension controller may be operable to control the actuator to increase the tension in the drive belt towards the high belt tension when the actions of the driver indicate that the engine is to be stopped by the stop-start system. As such, the belt tension controller may be operable to control the actuator to reduce the tension in the drive belt towards the low belt tension limit when the actions of the driver indicate that the engine is to be started.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 6 is a schematic view in the direction of arrow "F" on FIG. 5 showing a drive belt and tensioner forming part of the engine drive belt tensioner system shown in FIG. 5

DETAILED DESCRIPTION

Figure 1:
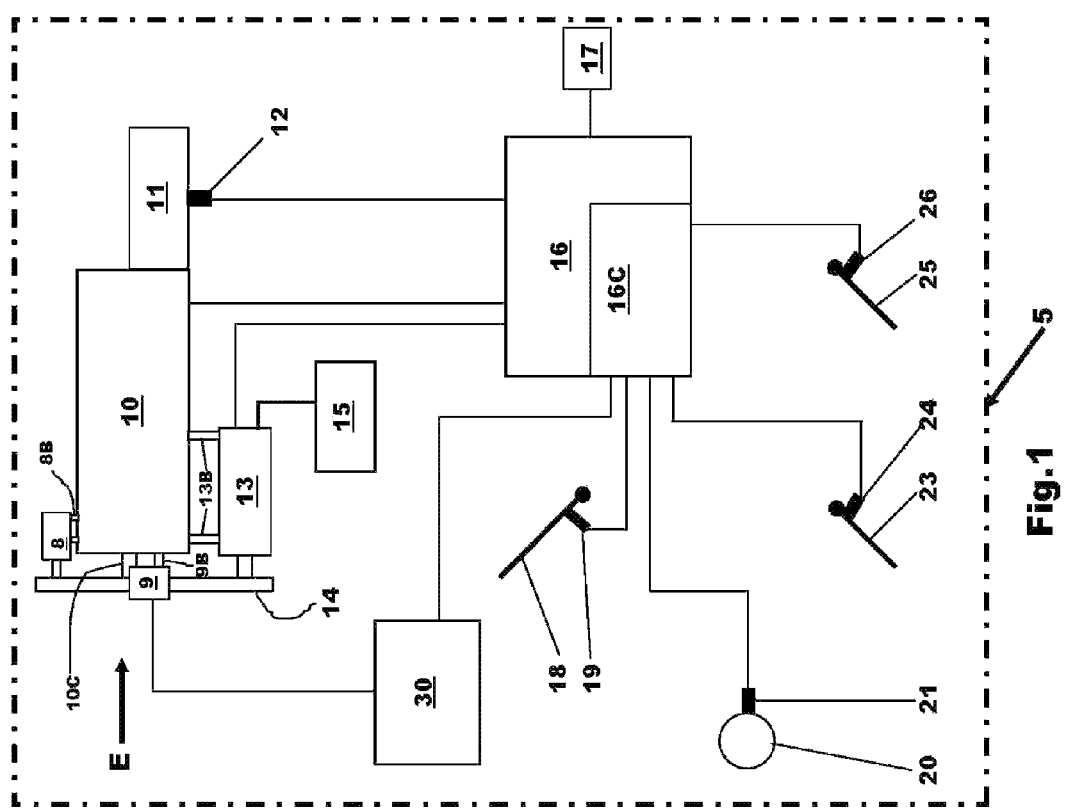
FIG. 1 is a schematic representation of a motor vehicle according to a third aspect of the invention having a first embodiment of an engine drive belt tensioner system according to a second aspect of the invention
Figure 2:
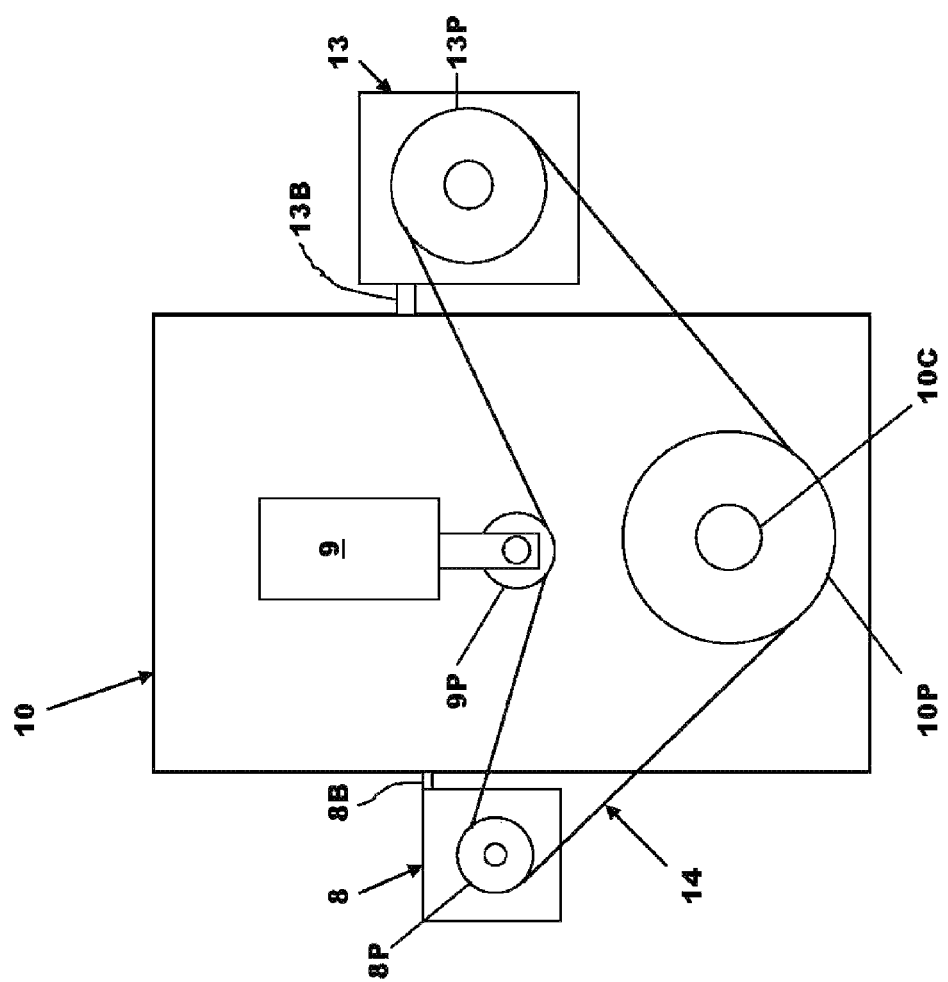
FIG. 2 is a schematic view in the direction of arrow "E" on FIG. 1 showing a drive belt and tensioner forming part of the engine drive belt tensioner system shown in FIG. 1

With reference to FIGS. 1 and 2 there is shown a motor vehicle 5 having an engine 10 driving a multi-speed transmission 11. The transmission 11 driveably connects to the engine 10 by a clutch (not shown) which in this case is manually engaged or released by a driver of the motor vehicle 5 and has a gear selector (not shown). The gear selector is moveable between several positions including at least one position where a gear forming part of the multi-speed transmission is selected and a neutral position in which no gears of the multi-speed transmission are selected. When the gear selector is moved to the neutral position the multi-speed transmission 11 is said to be in a 'neutral' state in which drive cannot be transmitted by the multi-speed transmission and when the gear selector is moved to an in gear position the multi-speed transmission 11 is said to be in an 'in-gear' state in which drive can be transmitted by the multi-speed transmission 11.

An integrated starter-generator 13 is driveably connected to the engine 10 by a flexible drive in the form of a drive belt 14 to a crankshaft 10C of the engine 10. The starter-generator 13 is connected to a source of electrical energy in the form of a battery 15 and can be used to start the engine 10. The battery 15 can be recharged by the starter-generator 13 when the starter-generator 13 is operating as an electrical generator. In this case the starter-generator 13 is a 48 volt starter-generator 13 but it will be appreciated that the invention is applicable to starter-generator using any other suitable voltage.

In some embodiments the starter-generator 13 can also be used to temporarily supplement the power being produced by the engine 10 to drive the motor vehicle 5 by operating it as a motor and providing power to the engine 10 via the drive belt 14. In such a case the motor vehicle 5 is often referred to as being a 'mild hybrid' vehicle. The starter-generator 13 can be used as a motor to supplement the engine 10 by providing a 'power boost' to the engine 10 to assist with acceleration or take-off or by 'load leveling' where the starter-generator 13 supplies power previously stored in the battery 15 to allow the engine 10 to be operated at a lower output thereby reducing fuel consumption and engine emissions.

In some embodiments, particularly those where the engine 10 is a diesel engine, the starter-generator 13 is only used to start the engine 10 during start-stop operation while the engine 10 is warm and, for initial starting from cold, a conventional starter motor (not shown in FIGS. 1 to 3) driving a ring gear on a flywheel of the engine 10 is used for starting the engine 10 from cold or for manual starts by the driver.

It will be appreciated that during the use of the starter-generator 13 as a motor to supplement the engine 10 the starter-generator 13 drives the crankshaft 10C of the engine 10 and that at other times when energy is to be recuperated or the battery 15 requires recharging the starter-generator 13 is driven by the engine 10 to generate electrical power.

The starter-generator 13 has a drive pulley 13P with which the drive belt 14 is drivingly engaged and is attached to the engine 10 by a pair of brackets 13B.

The crankshaft 10C is drivingly connected to a crankshaft pulley 10P with which the drive belt 14 is drivingly engaged.

In this case, the drive belt 14 is also drivingly engaged with a drive pulley 8P of an air conditioner pump 8. However, it will be appreciated that in other embodiments the drive belt 14 may only be drivingly engaged with the starter generator pulley 13P and the crankshaft pulley 10P or may drive one or more other accessory components. The air conditioner pump 8 is attached to the engine by a pair of brackets 8B.

Such a drive belt arrangement is often referred to as a front end accessory drive (FEAD). A belt tensioner actuator 9 urges a tensioner wheel 9P against the drive belt 14 so as to vary the tension in the drive belt 14 between High and Low Belt Tension limits. The position of the tensioner wheel 9P and hence the tension produced in the drive belt 14 by the actuator 9 is controlled by a belt tension controller 30. The belt tensioner actuator 9 is attached to the engine 10 by a pair of brackets 9B.

The High Belt Tension limit is that required to transmit the maximum torque possible based upon system configuration between the drive belt 14 and the crankshaft pulley 10P, air conditioner pump pulley 8P or starter generator pulley 13P without drive belt slippage. The Low Belt Tension limit is the lowest belt tension required to prevent drive belt slippage when no significant torque is being transferred to or from the drive belt 14.

A high belt tension is normally required if the starter-generator 13 is being used to start the engine 10 or supplement the power of the engine 10. In such circumstances 10 to 20 kW of power may be produced by the starter-generator 13 and the drive belt tension will be required to be at or close to the High Belt Tension limit.

The drive belt tension at or close to the Low Belt Tension limit will normally be used whenever possible in order to reduce the friction between the drive belt 14, the pulleys 8P, 13P and the crankshaft pulley 10P thereby reducing friction losses, reducing engine emissions and reducing the fuel consumption of the engine 10.

The Low Belt Tension limit is applicable to situations where no significant battery charging is required, the air conditioner pump 8 is not operating or is operating at very low load and the starter-generator 13 is not supplementing the power of the engine 10 and the engine 10 is operating in a cruise condition. It will be appreciated that when the engine 10 is accelerating or decelerating the tension in the drive belt 14 may need to be higher than when the engine 10 is running at constant speed in cruise conditions due to the effect of the inertias of the air conditioner pump 8 and the starter-generator 13.

It will be appreciated that the actuator 9 can continuously vary the tension in the drive belt 14 between the Low Belt Tension limit and the High Belt Tension limit to suit the prevailing operating conditions. In one example a high belt tension is higher than a low belt tension. In another example, a high belt tension is at or near, e.g., approximately, the High Belt Tension limit, and similarly a low belt tension is at or near, e.g., approximately, the Low Belt Tension limit.

The actuator 9 is operated so as to maintain the tension in the drive belt 14 irrespective of whether power is or is not supplied to it and retains the current drive belt tension if a control signal from the belt tension controller 30 is not received to alter the drive belt tension. A belt tensioner suitable for use in an apparatus and method constructed in accordance with this invention is shown and described in U.S. Pat. No. 7,217,206. It will however be appreciated that the invention is not limited to the use of such an actuator and that other types of actuator could be used with beneficial effect.

As an alternative to the use of a gear driven actuator described in U.S. Pat. No. 7,217,206 the actuator may be arranged to default to the High Belt Tension Limit if all power is cut-off such as in the case of a Key-off event. The advantage of such an actuator is that if the starter-generator is to be used to start the engine 10 the belt tension will always be at the High Belt Tension limit when the engine 10 is started even if the start is not an automatic one but is a manual one produced in response to activation of an ignition switch 17.

It will however be appreciated that in other cases the actuator 9 could be controlled to increase the tension to the High Belt Tension limit whenever a key-off event occurs as part of the engine shutdown procedure if the starter-generator 13 is to be used to restart the engine 13.

The actuator 9 and hence the tension in the drive belt 14 is controlled by the belt tension controller 30 that is operatively connected to an electronic control unit 16. The actuator 9 and the belt tension controller 30 forming in combination a drive belt tensioner system.

A driver operable on-off device in the form of the ignition switch 17 is used to control the overall operation of the engine 10. That is to say, when the engine 10 is running the ignition switch 17 is in a 'key-on' position and when the ignition switch 17 is in a 'key-off' position the engine 10 is not able to run. The ignition switch 17 also includes a third momentary position used to manually start the engine 10. It will be appreciated that other devices may be used to provide this functionality and that the invention is not limited to the use of an ignition switch.

The electronic control unit 16 is connected to the starter-generator 13, to the engine 10, to the drive belt tension controller 30, to a gear selector sensor 12 used to monitor whether the transmission 11 is in neutral or in gear, to a vehicle speed sensor 21 used to measure the rotational speed of a road wheel 20, to a crankshaft sensor (not shown) used to monitor the rotational speed of the crankshaft 10C of the engine 10, to a brake pedal position sensor 24 used to monitor the position of a brake pedal 23, to a clutch pedal position sensor 26 used to monitor the position of a clutch pedal 25 and to an accelerator pedal position sensor 19 used to monitor the position of an accelerator pedal 18. The accelerator pedal 18 provides a driver input of required power output from the engine 10.

The measurement of motor vehicle speed may be via the use of the road wheel sensor 21 or any other convenient means. If the accelerator pedal 18 has been moved from a rest position it is said to be in a 'pressed' position or in a 'pressed' state. If the clutch pedal 25 is pressed sufficiently to indicate driver intent to disengage the clutch it is said to be 'pressed', however if the clutch pedal is pressed sufficiently to disengage the clutch so that no drive can be transmitted it is said to be 'depressed'. It will be appreciated that the term 'gear selector sensor' is not limited to a sensor that monitors the position of the gear selector but rather is any device which can provide a feedback of whether the transmission 11 is in gear or in neutral. Similarly, the term 'brake pedal sensor' is not limited to a sensor that monitors the position of the brake pedal but rather is any device that provides feedback of whether an operator of the motor vehicle 5 has applied pressure to the brake pedal 23 to apply the brakes of the motor vehicle 5. For example the brake pedal sensor could monitor the pressure of the fluid in one or more brake lines. When the brake pedal 23 has been pressed sufficiently to apply the brakes it is said to be in a 'pressed' state or in a 'pressed' position.

The electronic control unit 16 receives several signals from the engine 10 including a signal indicative of the rotational speed of the engine 10 from the engine speed sensor 21 and sends signals to the engine 10 used to control shutdown and start-up of the engine 10. In a case where the engine 10 is a spark ignited engine 10, the signals sent from the electronic control unit 16 are used to control a fuel supply system (not shown) for the engine 10 and an ignition system (not shown) for the engine 10. In the case of a diesel engine the fuel supply to the engine is controlled.

The electronic control unit 16 comprises of various components including a central processing unit, memory devices, one or more electronic processors including a stop-start controller 16C, timers and signal processing devices to convert the signals from the various sensors connected to the electronic control unit 16 into data which is used by the electronic control unit 16 to control the operation of the engine 10 and, in particular, in the case of the stop-start controller 16C, the automatic stopping and starting of the engine 10.

During normal engine running the electronic control unit 16 in the case of a gasoline engine is operable to control the fuel supplied to the engine 10 and to adjust the ignition system so that sparks are supplied to the engine 10 from spark plugs at the correct timing to produce the desired engine torque. In the case of a diesel engine, the electronic control unit 16 is operable to control the fuel supplied to the engine 10 to produce the desired engine torque. The normal engine running control may be done via a separate engine management unit or engine control unit operatively connected to the electronic controller 16 or directly by the electronic control unit 16.

The engine 10 is operable in two modes, a first or stop-start running mode and a second or continuous running mode. As referred to previously one or more separate electronic controllers could be used to control the normal running of the engine 10 and the electronic controller 16 and, in particular, the stop-start controller 16C may only control the switching of the engine 10 between the two modes of operation and the automatic stopping and starting of the engine 10. It will also be appreciated that the drive belt tension controller 30 could be formed as a part of the electronic control unit 16.

All of the components used to stop and start the engine 10 in response to driver actions form in combination an engine stop-start system of which the electronic control unit 16 and, in particular, the stop-start controller 16C is a major component.

One factor used in the case of this example to determine whether the engine 10 is operated in the second mode or in the first mode is whether the motor vehicle 5 is moving. If the motor vehicle 5 is moving then the engine is operated in the second mode and the engine 10 will be run continuously and, if the motor vehicle 5 is not moving, the engine 10 will normally be run in the first mode in which automatic stop-start operation of the engine 10 will occur.

It will however be appreciated that in some variations of stop-start technology the engine can be stopped and restarted while it is moving. When the engine 10 is operating in the second mode it is run continuously so long as the ignition switch 17 remains in an 'on' position.

In the first or stop-start mode the engine 10 is selectively stopped and started when one or more predetermined engine stop and start conditions exist. These stop and start conditions are based upon the actions of the driver as provided by the signals received by the electronic control unit 16 and, in particular, by the stop-start controller 16C from the accelerator pedal position sensor 19, the brake pedal position sensor 24, the clutch sensor 26 and the gear selector sensor 12. The position or state of the clutch pedal 25, the accelerator pedal 18, the brake pedal 23 and the engagement state of the transmission 11 are all different motor vehicle variables which can be used to control the operation of the engine 10 and the combination used will depend upon various factors including whether the system is a 'stop in gear' system or a 'stop in neutral' system or a combination of both.

For the purpose of this example, the engine 10 is only stopped when the motor vehicle 5 is stationary, the transmission 11 is in neutral, the clutch pedal 25 is not being pressed and the accelerator pedal 18 is not being pressed and, when all these conditions are present, the conditions for an engine stop are met.

In the case of this example, the engine 10 is restarted when the clutch pedal 25 is moved to from an un-pressed position to a pressed position and the gear selector remains in the neutral position and, if both are present, the conditions for an engine start are met. Therefore in the case of this example the stop-start system is a 'stop in neutral' system.

It will be appreciated that the invention is not limited to these specific combinations and other combinations of motor vehicle variables could be used.

It will also be appreciated that the engine 10 may also be started fully automatically by the stop-start controller 16C if, for example and without limitation, the state of charge of the battery 15 drops to a low level and the transmission 11 is in neutral.

Operation of the drive belt tensioner system will now be described, with reference to FIG. 3. When the engine 10 is being operated in the first mode the actions of the driver determine whether it is running or stopped. When the conditions for an engine stop are met, the stop-start controller 16C sends a signal to the drive belt tension controller 30 indicating that the engine 10 is to be stopped and also commences to stop the engine 10. The engine speed will then begin to fall as indicated by the 'Engine Speed (Stop)' line on FIG. 3.

It will be appreciated that the belt tension controller 30 could independently establish that the engine is to be stopped by direct connection to one or more sensors or by monitoring the state of another electronic controller such as for example an engine control unit or fuel injection control unit.

In response to the receipt of the engine stop notification from the stop-start controller 16C the drive belt tension controller 30 begins to increase the tension in the drive belt 14 by commanding the actuator 9 to apply more load to the tensioner wheel 9P. It will be appreciated that a finite amount of time is required to increase the drive belt tension from its current level to a maximum tension limit referred to as 'High Belt Tension' on FIG. 3 and that the tension may begin to increase before stopping of the engine 10 commences. The time required to go from the Low Belt Tension limit is in this case in the order of 1.0 to 2.0 seconds. However the speed of response of the actuator 9 will depend upon the specific construction and type of actuator used.

Figure 3:
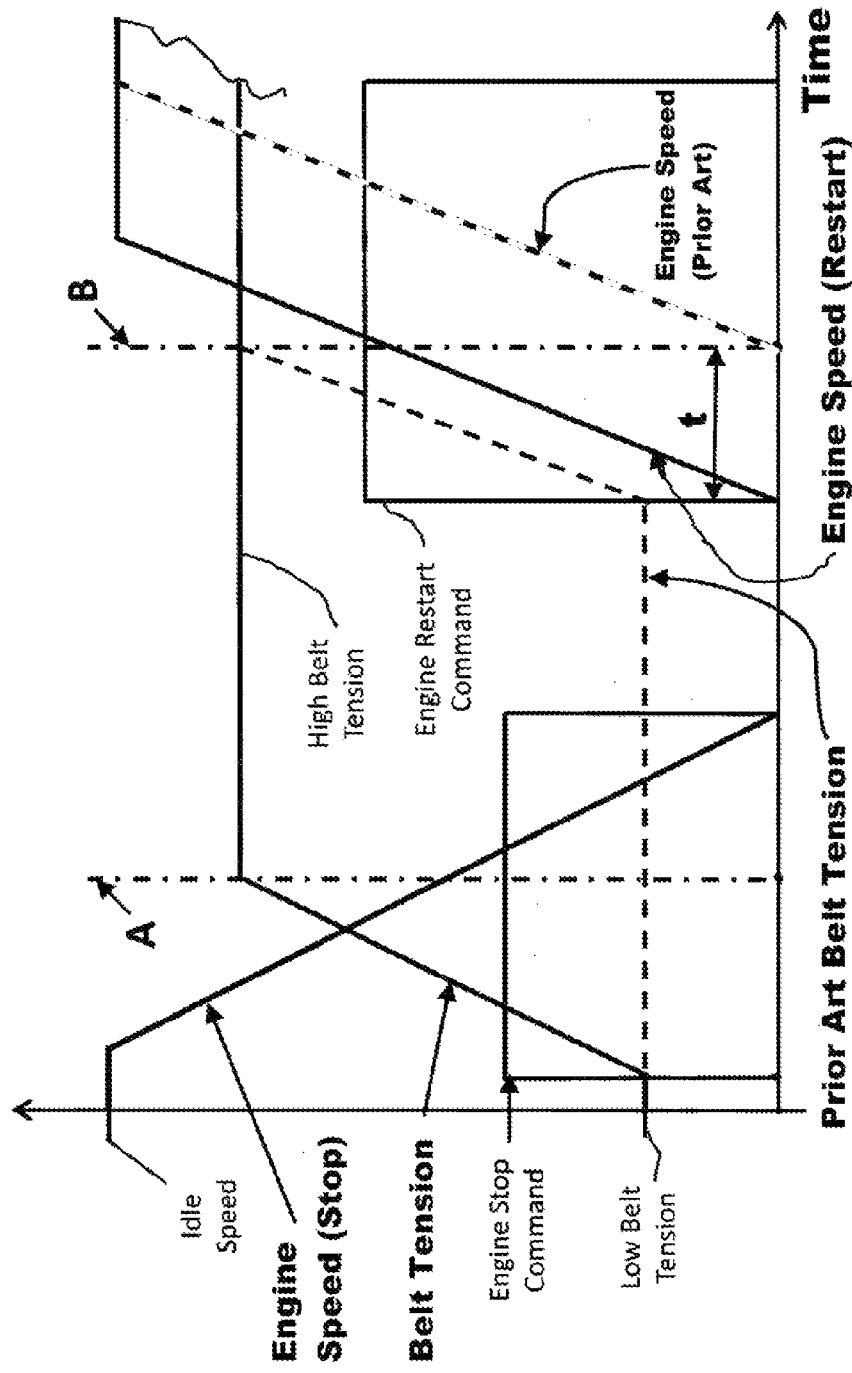
FIG. 3 is a time line chart showing variations in engine speed and drive belt tension during an engine stop and restart sequence for a prior art arrangement and in accordance with the first embodiment of the second aspect of the invention

Now referring to FIG. 3, a line chart showing variations in engine speed and drive belt tension during an engine stop and restart sequence is shown, with regard to FIGS. 1-2. In FIG. 3 the drive belt tension is increased from its minimum limit referred to as 'Low Belt Tension' on FIG. 3 to the High Belt Tension as indicated by the line 'Belt Tension' reaching the High Belt Tension level at time "A".

Therefore during run-down of the engine 10 the drive belt tension is increased until a high belt tension is obtained which in this case is a drive belt tension at or close to the High Belt Tension limit but could be a drive belt tension lower than this. Because the tension in the drive belt 14 is being increased the friction between the drive belt 14 and the pulleys 8P, 10P and 13P will be increased thereby increasing the deceleration of the engine 10 and reducing the time required for the engine 10 to slow to a halt.

It will be appreciated that the drive belt tension could initially be above the Low Belt Tension level depending upon the operating conditions prevailing when the engine 10 is commanded to stop.

The drive belt tension is then maintained at the high belt tension used to slow the engine 10 until the engine 10 has been restarted and it is determined that the high belt tension is no longer required.

When an engine restart command is produced, due to the required conditions for an engine start having been met, the engine 10 can be immediately started because the drive belt tension is already at the required high belt tension. The engine speed increases as indicated by the line 'Engine Speed (Restart) on FIG. 3 until the restart is complete and the engine is idling.

It will be appreciated that, while the engine 10 is operating in the second mode, the tension in the drive belt 14 is continuously varied by the drive belt tensioner system to minimize belt tension without compromising drive efficiency. That is to say, the minimal tension is used to transmit torque based upon current needs without allowing belt slip to occur.

In order to achieve this, the belt tension controller 30 receives information or a control input from one or more sensors on the motor vehicle or a control input from the electronic control unit 16. For example the belt tension controller 30 may receive an input indicating that the starter-generator 13 is going to be used to supplement the power from the engine 10 and in such a situation the belt tension controller 30 is operable to command the belt tension actuator 9 to increase the belt tension to the High Belt Tension limit.

Similarly, the belt tension controller 30 may receive an input indicating that the starter-generator 13 is going to be used to recharge the battery 15 and in such a situation the belt tension controller 30 is operable to command the belt tension actuator 9 to increase the belt tension from the Low Belt Tension Limit to a tension between the High Belt Tension limit and the Low Belt Tension Limit.

The drive belt tension may remain at the high belt tension level used for slowing the engine 10 during the engine shut down for a short period following a restart particularly if the starter-generator 13 is being used to supplement the power of the engine 10.

Apparatus for controlling drive belt tension is described in U.S. Pat. No. 4,478,595 and in GB Patent 2435522 and techniques similar to those described in these patents could be used by the belt tension controller 30 to control the variation in drive belt tension during normal running in combination with experimentally produced data relating drive belt load to belt slippage.

FIG. 3 also shows the situation for a prior art arrangement in which the belt tension is not adjusted until the engine 10 is to be started. The broken line 'Prior Art Belt Tension' shows the variation in drive belt tension for the same period of time as discussed previously.

In this case, the drive belt tension is not increased until the conditions for a restart have been met as indicated by the 'Engine Restart Command' line on FIG. 3. The tension is then increased until at time "B" the high belt tension level required to prevent slip is reached. It will be appreciated that the high belt tension level is not reached in this case until a delay of 't' seconds has elapsed after the restart command is produced and so starting of the engine 10 is delayed by the same amount of time.

After engine start-up commences the engine speed increases as indicated by the broken line 'Engine Speed (Prior Art)' until the restart is complete and the engine 10 is idling. The restart of the engine 10 is delayed by 't' seconds in the case of the prior art approach compared to the method and apparatus constructed in accordance with this invention. This is because the drive belt tension needs to be at or very close to the High Belt Tension limit before the starter-generator 13 is used to start the engine 10 otherwise excessive belt slippage will occur.

Figure 4:
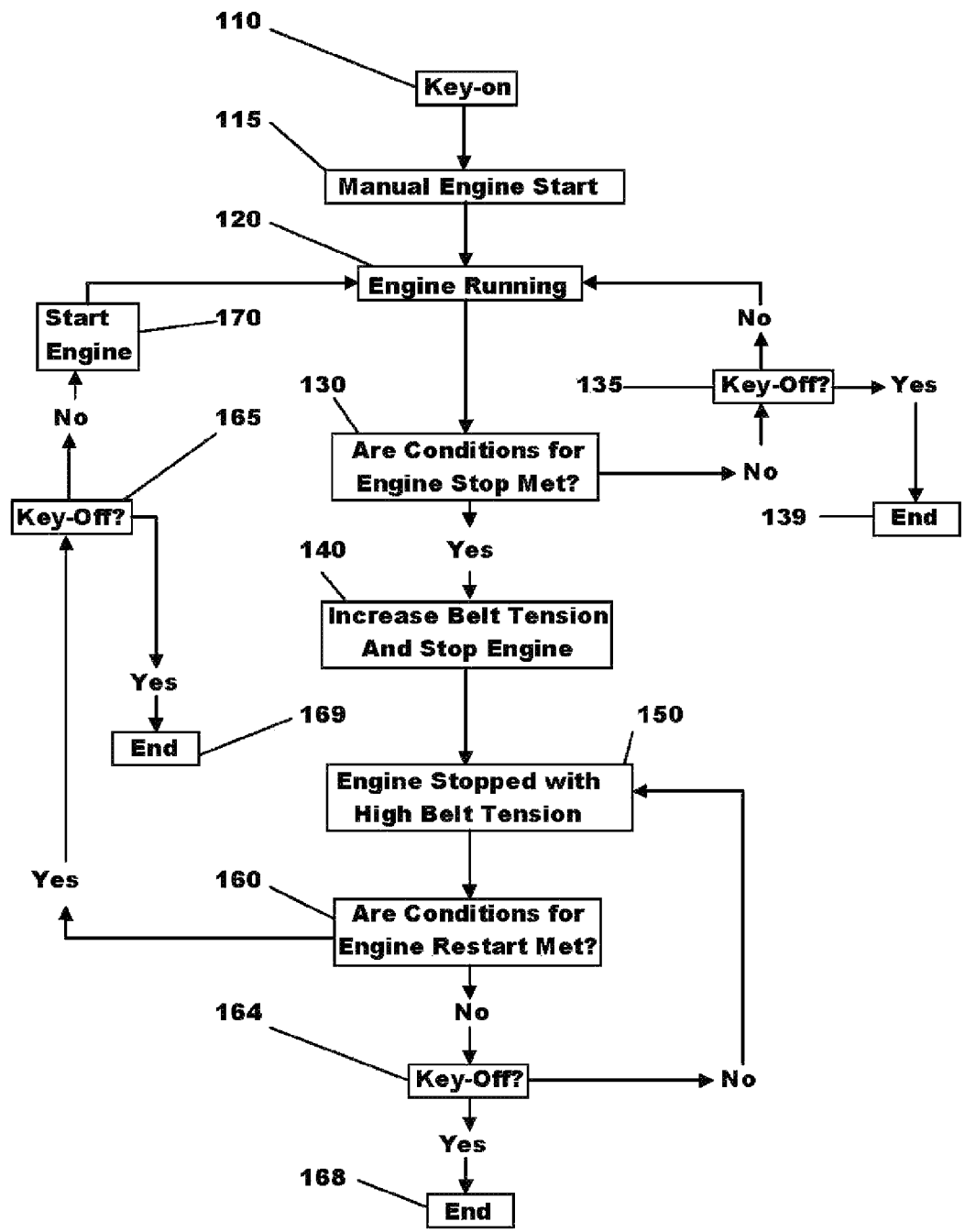
FIG. 4 is a flow chart showing various steps of a first embodiment of a method for controlling an engine drive belt tension system according to a first aspect of the invention

Now referring to FIG. 4, a flow chart for controlling an engine drive belt tension system is shown, with regard to FIGS. 1-2. The method starts at box 110 which is a key-on event and is followed by a manual start as indicated in box 115 and resulting in the engine 10 running as shown in box 120. The manual start may be performed using the starter-generator 13 or may be performed using a conventional starter motor (not shown) depending upon the type and size of the engine 10 and whether the engine 10 is being started from cold.

From box 120 the method advances to box 130 where it is checked whether the conditions for an engine stop are met. As previously discussed, by way of example, these are that the motor vehicle 5 is not moving, the transmission 11 is in neutral and the clutch pedal 25 is not being pressed. If these conditions are present, the engine 10 will be stopped as indicated by the advancement of the method to box 140 and the drive belt tension will be adjusted from its current level to the High Belt Tension limit by the drive belt tension system 9, 30 during the engine stop or shutdown event.

If the conditions for an engine stop are not met the method moves to box 135 to check whether a key-off event has occurred and, if it has the method ends at box 139 and otherwise it returns to box 120 with the engine 10 still running.

It will be appreciated that whenever a key-off event occurs the engine 10 will also be stopped and that the drive belt tension system could in such a case be operable to increase the belt tension to the High Belt Tension limit in such a case or maintain it at the High Belt Tension limit if it is already in such a state.

Referring back to box 140, because the drive belt tension system 9, 30 increases the tension in the drive belt 14 as the engine 10 is slowing down to zero this increases the friction between the drive belt 14 and the pulleys 8P, 10P and 13P and slows the engine 10 more quickly.

From box 140 the method advances to box 150 where the engine 10 is stopped and the drive belt tension is at the High Belt Tension limit.

The method then advances to box 160 to check whether the conditions for an engine restart have been met. In this case the gear selector lever must be in a neutral position and the clutch pedal has to be moved from a non-pressed state to a pressed state for these conditions to be met. However, as previously referred to the conditions could also be met automatically if the state of the charge of the battery 15 falls below a predetermined low level and the transmission is in neutral. In either case if the conditions for an engine start are met the method advances from box 160 to box 165.

In box 165 it is checked whether a key-off event has occurred and, if it has, the method ends at box 169 and otherwise it advances to box 170 to restart the engine 10 and then to box 120 with the engine 10 running.

If in box 160 the conditions for an engine start are not met the method advances from box 160 to box 164. In box 164 it is checked whether a key-off event has occurred and, if it has, the method ends at box 168 and otherwise it returns to box 150 with the engine 10 still stopped and the drive belt tension still high.

It will be appreciated that a key-off event can occur at other times from those shown and that in each case the method will end. In such circumstances the engine 10 will be stopped with a high belt tension if the starter-generator 13 is to be used to start it.

Referring back to box 120, when the engine 10 is running in the second mode of operation it is continuously determined what level of drive belt tension is required to prevent slippage of the drive belt 14. Therefore in some cases the drive belt tension may already be at the High Belt Tension limit when the engine is stopped and in such a case the operations in box 140 would be to stop the engine 10 and to maintain the drive belt tension at the High Belt Tension limit.

The Low and High Belt Tension limits are not the minimum and maximum drive belt tensions achievable by the drive belt tensioning system 9, 30 they are the minimum and maximum drive belt tensions required to prevent drive belt slippage for the particular drive belt arrangement when subjected to maximum and minimum load. As previously referred to, the drive belt tension system 9, 30 operates during normal engine running to maintain the drive belt tension at the lowest possible level for the current load without drive belt slippage.

Figure 5:
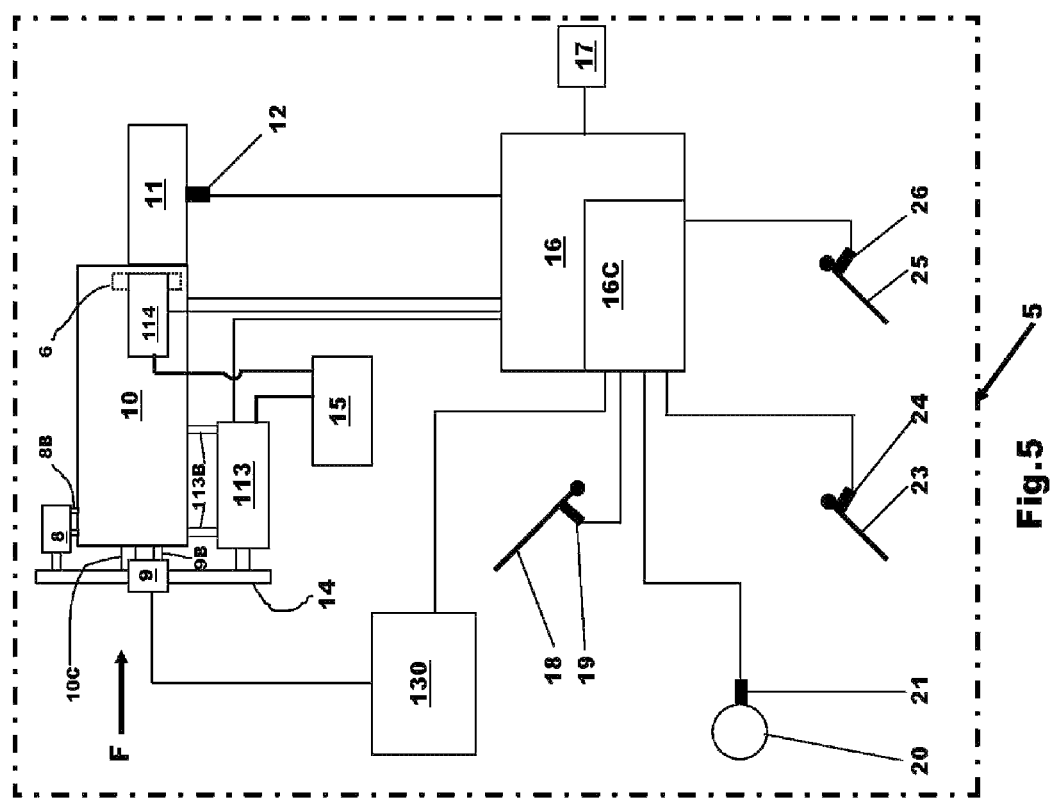
FIG. 5 is a schematic representation of a motor vehicle according to the third aspect of the invention having a second embodiment of an engine drive belt tensioner system according to the second aspect of the invention

With reference to FIGS. 5 and 6 there is shown a motor vehicle 5 having an engine 10 driving a multi-speed transmission 11 which in most respects is identical to that previously described with reference to FIGS. 1 and 2 and so will not be described again in detail and for which like parts have the same reference numbers.

The primary difference between this embodiment and that previously described is that instead of using a starter-generator to restart the engine 10 following a driver instigated automatic stop a starter motor 114 is engageable with a ring gear 6 fastened to a flywheel of the engine 10.

Therefore in this case the drive belt 14 drives an electric generator in the form of an alternator 113 and not a starter-generator. The alternator 113 is attached to the engine 10 by brackets 113B and has a pulley 113P drivingly engaged with the drive belt 14.

In addition, the drive belt tensioner system comprises as before an actuator 9 and a belt tension controller 130 but the functionality of the belt tension controller 130 differs from that previously described with respect to the belt tension controller 30 shown in FIG. 1 to match the requirements of the starter motor 114.

As before the belt tensioner actuator 9 urges the tensioner wheel 9P against the drive belt 14 so as to vary the tension in the drive belt 14 between High and Low Belt Tension limits and the position of the tensioner wheel 9P and hence the tension produced in the drive belt 14 by the actuator 9 is controlled by the belt tension controller 130.

As before described, the High Belt Tension limit is that required to transmit the maximum torque possible based upon system configuration and the Low Belt Tension limit is the lowest belt tension required to prevent drive belt slippage when no significant torque is being transferred to the drive belt 14.

The Low Belt Tension limit is normally used whenever possible in order to reduce the friction between the drive belt 14, the pulleys 8P, 113P and the crankshaft pulley 10P thereby reducing friction losses, reducing engine emissions and reducing the fuel consumption of the engine 10.

The Low Belt Tension limit is applicable to situations where no significant battery charging is required and the air conditioner pump 8 is not operating or is operating at very low load.

It will be appreciated that when the engine 10 is accelerating or decelerating the tension in the drive belt 14 may need to be higher than when the engine 10 is running at constant speed in cruise conditions due to the effect of the inertias of the air conditioner pump 8 and the alternator 113.

It will be appreciated that, during operation in the second mode, the actuator 9 continuously varies the tension in the drive belt 14 between the Low Belt Tension limit and the High Belt Tension limit to suit the prevailing operating conditions.

As previously described, the actuator 9 is operated so as to maintain the tension in the drive belt 14 irrespective of whether power is or is not supplied to it and retains the current drive belt tension even if a control signal from the belt tension controller 130 is not received to alter the drive belt tension.

A belt tensioner suitable for use in accordance with this embodiment of the invention is shown and described in U.S. Pat. No. 7,217,206. It will however be appreciated that the invention is not limited to the use of such an actuator and that other types of actuator could be used with beneficial effect.

The actuator 9 and hence the tension in the drive belt 14 is controlled by the belt tension controller 130 that is operatively connected to the electronic control unit 16 as previously discussed. The functionality of the electronic controller 16 and the stop-start controller 16C are essentially the same as previously discussed and so will not be described again. The actuator 9 and the belt tension controller 130 form in combination the drive belt tensioner system.

As before the belt tension controller 130 is responsive to commands or signals indicating when the engine 10 is to be stopped in response to driver actions or restarted following such a stop either by the actions of the driver or as previously referred to automatically due to, for example, a demand for air conditioning or a low state of charge of the battery 15.

Figure 7A:
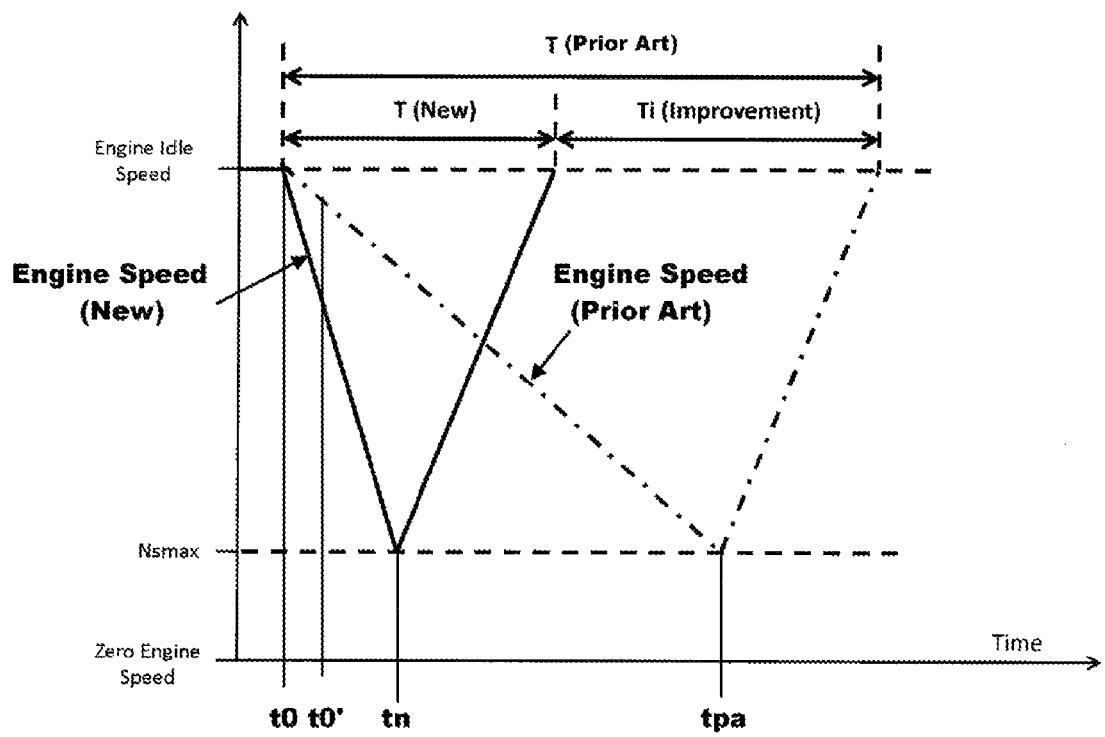
FIG. 7A is a time line chart showing variations in engine speed during a first engine stop and restart sequence for a prior art arrangement and in accordance with the second embodiment of the second aspect of the invention

Now referring to FIG. 7A an engine stop (shutdown) and restart sequence for the motor vehicle 5 having a drive belt tensioner system 9, 130 according to the second embodiment and a corresponding prior art stop (shutdown) and restart sequence is shown, with regard to FIGS. 5-6.

Referring firstly to the sequence achievable by use of a drive belt tensioner system according to the second embodiment of the invention, an engine stop command/signal is received or generated internally by the drive belt tension controller 130 at time t0. The drive belt tension controller 130 is then operable to increase the tension in the drive belt 14 from its current level to a high belt tension which in this case equal to the High Belt Tension limit. This increase in tension will increase the friction between the drive belt 14 and the associated pulleys 8P, 10P and 113P thereby acting as a brake and increasing the deceleration of the engine 10. The engine 10 will continue to decelerate towards zero RPM but in the sequence shown, shortly after the engine stop has been requested at time t0 a driver change of mind occurs at time t0' and it is required to restart the engine 10 as soon as possible.

However, the starter motor 114 cannot be engaged until the engine speed has reduced to or below an upper speed limit for starter motor engagement referred to as a maximum engagement speed (Nsmax) which in this in this example is 200 RPM, and this speed is reached at time tn. As soon as the engine speed drops to the maximum engagement speed (Nsmax) for the starter motor 114, the starter motor 114 is engaged without delay to restart the engine 10.

The belt tension is then simultaneously reduced by the drive belt tensioner system 9, 130 towards the Low Belt Tension limit to reduce friction to a minimum which assists the starter motor 114 to restart the engine 10.

The starter motor 114 will cause the engine 10 to be restarted such that it reaches idle speed after a time period T(New) seconds has elapsed from the time t0.

Referring now to a prior art situation where a lower drive belt tension is used for the stop phase, an engine stop command/signal is generated at time t0. The engine 10 will begin to decelerate but, due to the lower belt tension, at a lower rate towards zero RPM. As before, shortly after the engine stop has been requested at time t0 a driver change in mind occurs at time t0' and it is required to restart the engine 10 as soon as possible.

As before, the starter motor 114 cannot be engaged until the engine speed has reduced to or below the maximum engagement speed (Nsmax), and in this case this occurs at time tpa. The starter motor 114 is then engaged and the engine 10 is restarted such that it reaches idle speed after a time period T(Prior Art) seconds has elapsed from the time t0.

Therefore by using a belt tensioner system in accordance with this embodiment of the invention a reduction of Ti (Improvement) seconds is produced over the prior art. That is to say, the engine 10 is running again after only T(New) seconds rather than T(Prior Art) seconds.

This is because by using the drive belt tensioner system 9, 130 to increase the drive belt tension during a stop phase and reduce it to a low level during a restart phase the minimum time required to restart the engine 10 is reduced compared to the prior art case.

It will be appreciated that, because the friction imposed by the drive belt 14 is reduced compared to the prior art, the starter motor 114 will be able to increase the speed of the engine 10 quicker. Therefore, not only is the time required to slow the engine to the maximum engagement speed (Nsmax) reduced so is the time to return the engine 10 to idle speed after a stop.

Figure 7B:
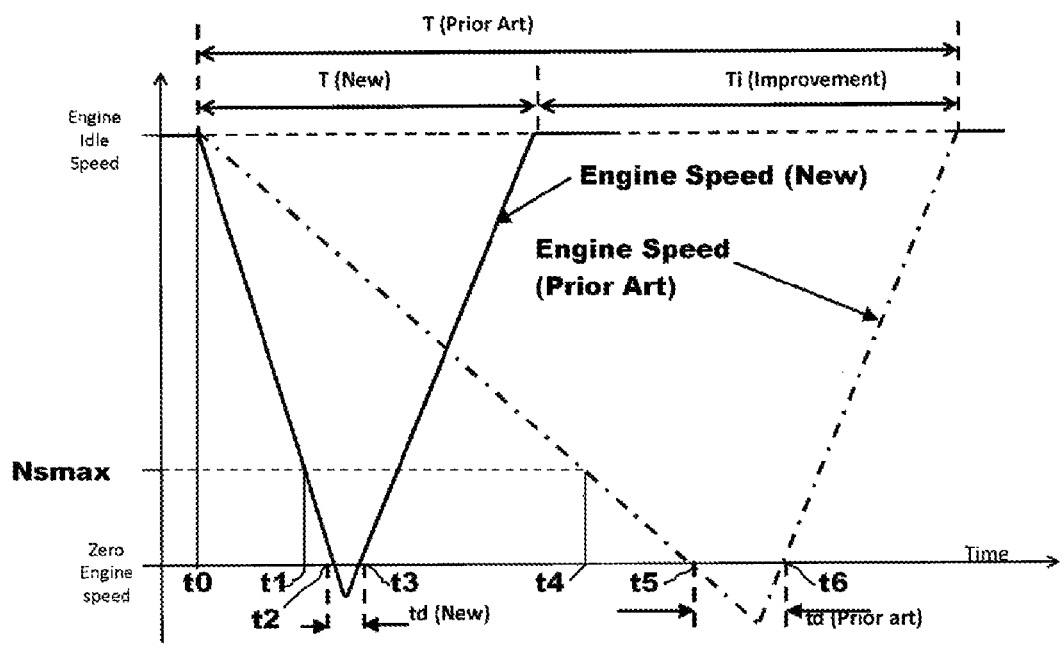
FIG. 7B is a time line chart showing variations in engine speed during a second engine stop and restart sequence for a prior art arrangement and in accordance with the second embodiment of the second aspect of the invention

Referring now to FIG. 7B a different stop-start sequence achievable by use of a drive belt tensioner system according to the second embodiment of the invention is shown.

As before, an engine stop command/signal is received or generated internally by the drive belt tension controller 130 at time t0. The drive belt tension controller 130 as before is operable to increase the tension in the drive belt 14 from its current level to the High Belt Tension limit. This increases the friction between the drive belt 14 and the associated pulleys 8P, 10P and 113P thereby acting as a brake and increasing the deceleration of the engine 10.

The engine 10 continues to decelerate towards zero RPM but in the sequence shown, overshoots zero at time t2 and continues to rotate in a reverse direction until time t3.

It will be appreciated that in practice there will be a short period of time preceding time t3 where the engine 10 is in a stable stationary state.

The starter motor 114 cannot be used to restart the engine 10 while it is rotating in a reverse direction and so it is important to minimize the time that the engine 10 rotates in the reverse direction and the high belt tension being applied to the drive belt 14 results in the reverse rotation of the engine 10 being damped out or halted in period of td(New) seconds ending at time t3.

The engine 10 can therefore be restarted at time t3 using the starter motor 114 such that the engine 10 reaches idle speed after a time period of T(New) seconds has elapsed from the time t0. As soon as the stable stationary state is detected (t3), the belt tension begins to be reduced by the drive belt tensioner system 9, 130 towards the Low Belt Tension limit and the starter motor 114 is engaged.

It will be appreciated that if a driver change of mind occurs between the time where the engine speed falls below the maximum engagement speed (Nsmax) and the time the engine reaches zero RPM that is to say between the times t1 and t2 then it can be restarted immediately and the tension is reduced as quickly as possible to the Low Belt Tension limit.

Referring now to a prior art situation where a lower drive belt tension is used for the stop phase, an engine stop command/signal is once again generated at time t0. As before the engine 10 will begin to decelerate but, due to the lower belt tension, at a lower rate towards zero RPM. As before, the engine speed continues to fall and overshoots causing the engine 10 to rotate in a reverse direction starting at time t5 and continuing to time t6. As before, in practice there will be a short period of time preceding time t3 where the engine 10 is in a stable stationary state. In this case, because the drive belt tension is lower it takes a longer period of td(Prior Art) seconds for the reverse rotation to be halted.

As soon as the stable stationary state is detected (t6), the starter motor 114 is engaged such that the engine 10 reaches idle speed after a time period of T(Prior Art) seconds has elapsed from the time t0. It will be appreciated that because in the prior art case the belt tension is lower during the engine shut down the time taken to reach zero RPM is longer and the reverse rotation takes longer to damp out compared to the use of a method and apparatus in accordance with this invention. It will be appreciated that in both cases the actual period of reverse rotation will be affected by the throttle and fuelling strategy during shut down and the examples shown in FIG. 7B assume that the same conditions exist for both shut downs. Therefore by using a belt tensioner system in accordance with this invention a reduction of Ti (Improvement) seconds is produced over the prior art. That is to say, the engine 10 is running again after only T (New) seconds rather than T (Prior Art) seconds.

It will be appreciated that if a driver change of mind occurs between the time where the engine speed falls below the maximum engagement speed (Nsmax) and the time the engine reaches zero RPM that is to say between the times t4 and t5 then it can be immediately restarted without delay. Therefore by using the drive belt tensioner system 9, 130 to increase the drive belt tension during a stop phase and reduce it to a low level during a restart phase the minimum time required to restart the engine 10 is as before reduced. This is because the extra friction produced by the drive belt 14 helps to reduce the time that reverse rotation will occur and this in combination with the faster deceleration produced by the use of a high belt tension in the stop phase and the increased acceleration due to the use of a low belt tension during the restart phase significantly reduces the overall stop-start time.

Figure 8:
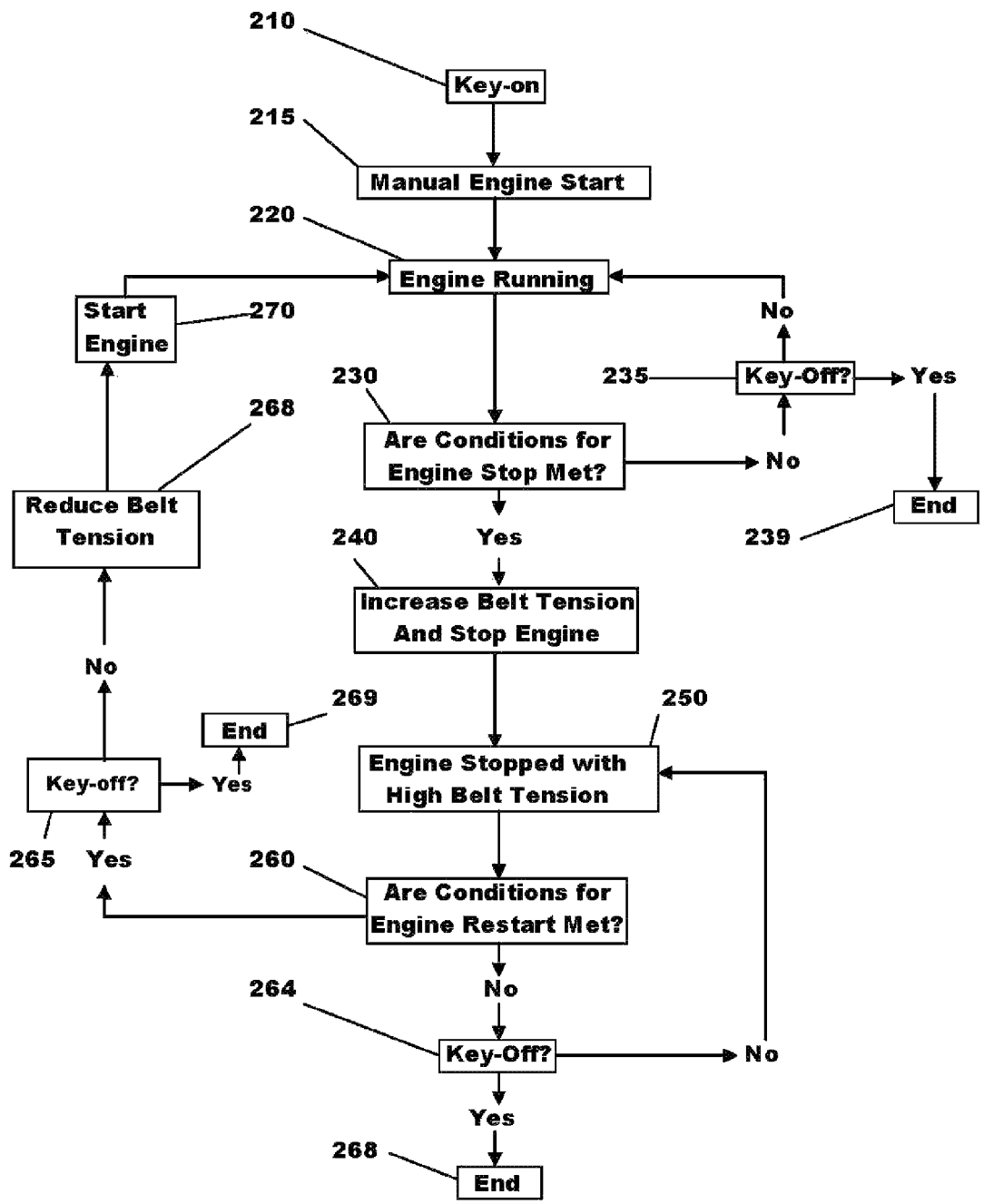
FIG. 8 is a flow chart showing various steps of a second embodiment of a method for controlling an engine drive belt tension system according to the first aspect of the invention.

Now referring to FIG. 8, a flow chart showing various steps for controlling an engine drive belt tension system is shown, with regard to FIGS. 5-6. The method starts at box 210 which is a key-on event and is followed by a manual start as indicated in box 215 and resulting in the engine 10 running as shown in box 220.

Continuing from box 220 the method advances to box 230 where it is checked whether the conditions for an engine stop are met. As previously discussed, these are in this case that the motor vehicle 5 is not moving, the transmission 11 is in neutral and the clutch pedal 25 has been released. If these conditions are present, the engine 10 will be stopped as indicated by the advancement of the method to box 240 and the drive belt tension will be adjusted from its current level to a high belt tension and in this case to the High Belt Tension limit by the drive belt tension system 9, 130.

If the conditions for an engine stop are not met the method moves to box 235 to check whether a key-off event has occurred and, if it has the method ends at box 239 and otherwise it returns to box 220 with the engine 10 still running.

It will be appreciated that whenever a key-off event occurs the engine 10 will also be stopped and that the drive belt tension system 9, 130 could in such a case be operable to reduce the belt tension to the Low Belt Tension limit ready for an engine start.

Referring back to box 240 the drive belt tension system 9, 130 increases the tension in the drive belt 14 as the engine 10 is running down to zero thereby increasing the friction and slowing the engine 10 more quickly.

If during this run-down phase a restart command is received due to a change of mind then it will depend upon whether the engine speed is below the maximum engagement speed (Nsmax) of starter-motor and is not rotating in a reverse direction along with all other relevant conditions for a restart whether a restart is permitted and if it is the method would jump from box 240 directly to box 265 and from there via boxes 268 where the drive belt tension is reduced to the Low Belt Tension Limit and box 270 where the starter motor starts the engine 10 back to box 220. It will be appreciated that the drive belt tension is reduced simultaneously with the starting of the engine 10.

Assuming that no change of mind occurs then from box 240 the method advances to box 250 where the engine 10 is stationary and the drive belt tension is at the High Belt Tension limit.

The method then advances to box 260 to check whether the conditions for an engine restart have been met. In this case the gear selector lever has to be in a neutral condition and the clutch pedal has to be moved from an un-pressed to a pressed state for these conditions to be met. However, as previously referred to the conditions could also be met automatically. In either case if the conditions for an engine start are met the method advances from box 260 to box 265. In box 265 it is checked whether a key-off event has occurred and, if it has, the method ends at box 269 and otherwise it advances to box 268.

In box 268 the drive belt tensioner system 9, 130 acts so as to reduce the tension in the drive belt 14 towards the Low Belt Tension limit and in box 270 the engine 10 is restarted and from box 270 the method advances to box 220 with the engine 10 running. It will be appreciated that the drive belt tension is reduced simultaneously with the starting of the engine 10.

If in box 260 the conditions for an engine start are not met the method advances from box 260 to box 264. In box 264 it is checked whether a key-off event has occurred and, if it has, the method ends at box 268 and otherwise it returns to box 250 with the engine 10 still stopped and in this case the drive belt tension still high.

It will be appreciated that a key-off event can occur at other times from those shown and that in each case the method will end.

Referring back to box 220, when the engine 10 is running in the second mode it is continuously determined what level of drive belt tension is required to prevent slippage of the drive belt 14. This can be achieved by a combination of experimentally derived look up tables or algorithms in combination with information regarding the current operating conditions of the engine 10 and the operating states of the alternator 113 and air conditioner pump 8.

As before, the Low and High Belt Tension limits are not the minimum and maximum drive belt tensions achievable by the drive belt tensioning system 9, 130 they are the minimum and maximum drive belt tensions required to prevent drive belt slippage for that particular drive belt arrangement.

Although in the method shown in FIG. 8 the drive belt tension is maintained at the high belt tension level until an engine start request is made, this need not be the case and the drive belt tension could be reduced to the Low Belt Tension limit as soon as it is confirmed that the engine 10 has reached a stable rest condition.

Therefore in summary it is advantageous to apply a load to an engine during a shutdown in order to increase the rate of deceleration thereby minimizing the time taken for the engine to come to a halt.

Two particularly advantageous solution have so far been described which use drive belt tension to achieve this by controlling a drive belt tensioning system to increase the tension in the drive belt during an engine stop. Such an approach has the advantage that a drive belt tensioner has to be provided for a drive belt and so no significant additional cost is incurred. In addition, by using the drive belt tensioning system to reduce the tension to a very low level when the load on the drive belt is light significant fuel and emission reductions can be obtained.

In the case of an engine having a belt drive starter-generator, the tension in the drive belt must be high when the starter-generator is used to start the engine or supplement the power of the engine to prevent belt slippage or belt jump and by ensuring that the belt tension is increased to this high level before the engine is started by the starter/generator a potential restart delay is avoided.

In the case of an engine using a starter motor having a pinion engageable with a ring gear attached to a flywheel, the starter motor cannot be used to restart the engine until the engine has slowed below an maximum engagement speed for the starter motor and by increasing the tension in the drive belt during the engine shutdown the time required to reach this speed is reduced. This is particularly relevant if, during the engine shut-down, the driver requests by their actions an engine restart because then a delay will occur until the engine slows to the maximum engagement speed for the starter motor.

Although the invention has been described with particular reference to a stop-start enabled motor vehicle having a manual transmission it will be appreciated that it could be applied with advantageous effect to a motor vehicle having a stop-start system and an automatic transmission.

Although the invention is particularly suitable for use with an endless V-belt drive it is also applicable to an endless stepped belt drive.

As described above, various methods for adjusting a belt tension of a vehicle, such as a hybrid electric vehicle or an engine stop start vehicle, may be used. The drive belt may drive various accessories, including a starter-generator electric machine, and optionally additional drive accessories such as pumps, etc. One example, method may include increasing tension in the drive belt while the engine is being stopped, for example, during an engine shut-down to rest, responsive to a request to stop the engine, etc., and increasing tension in the drive belt during another condition. Another condition may be a condition that is different than the engine being stopped. The increase/decrease in tension may be responsive to battery state of charge, temperature, engine load, vehicle speed, etc. In one example, tension is increased when the engine is cranked by the starter-generator, and decreased when engine output is meets driver demanded torque. Further tension may be increased responsive to an absolute value of one of assistance from the starter-generator, or braking (e.g., operating in the generator mode), being greater than a threshold, and tension may be decreased otherwise. Further, tension may be increased during operator actuation of a brake pedal, and decreased during release of the brake pedal responsive to the engine is still combustion and the vehicle is still moving.

It will be appreciated by those skilled in the art that although the invention has been described by way of example with reference to one or more embodiments it is not limited to the disclosed embodiments and that one or more modifications to the disclosed embodiments or alternative embodiments could be constructed without departing from the scope of the invention.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling an engine drive belt tensioner system of a motor vehicle, comprising:
controlling the drive belt tensioner system to increase tension in an associated drive belt to a high belt tension while an engine is being stopped and responsive to an engine stop command to slow the engine at least from idle speed, and then maintaining the high belt tension to until the engine has been restarted and reached the idle speed.

2. The method of claim 1, wherein the motor vehicle has a stop-start system to automatically stop and start the engine in response to predefined driver actions and the method comprises using the drive belt tensioner system to increase the tension in the drive belt towards the high belt tension when the actions of the driver indicate that the engine is to be stopped.

3. The method of claim 1, wherein the drive belt driveably connects the engine to a starter-generator.

4. The method of claim 3, further comprising using the high belt tension when the starter-generator is to be used to start the engine.

5. The method of claim 3, wherein the method further comprises using the high belt tension when the starter-generator is to be used to supplement a power output from the engine.

6. The method of claim 3, wherein belt tension remains at the high belt tension level used for slowing the engine during engine shut down for a period following the restart if the starter-generator is being used to supplement power of the engine.

7. An engine drive belt tensioner system for a motor vehicle, comprising:
an actuator to vary tension in an associated drive belt; and
a belt tension controller, including instructions stored in non-transitory memory to control the actuator to increase the tension in the associated drive belt to a high belt tension responsive to an engine being stopped and responsive to an engine stop command to slow the engine at least from idle speed, and then to maintain the high belt tension to until the engine has been restarted and reached the idle speed.

8. The system of claim 7, wherein the motor vehicle has a stop-start system to automatically stop and start the engine in response to predefined driver actions and the belt tension controller further includes instructions to control the actuator to increase the tension in the drive belt towards the high belt tension when the actions of the driver indicate that the engine is to be stopped by the stop-start system.

9. The system of claim 7, wherein the drive belt driveably connects the engine to a starter-generator.

10. The system of claim 9, wherein the belt tension controller further includes instructions to control the actuator to produce a high belt tension when the starter-generator is to be used to supplement a power output from the engine.

11. A method, comprising:
controlling a drive belt tensioner system of a vehicle's engine to increase tension in a belt to a high tension while the engine is being stopped and responsive to an engine stop request, receiving a driver change-of-mind to restart the engine before the engine is stopped, waiting until engine speed falls below a non-zero threshold, and then engaging a starter motor while simultaneously reducing the tension to restart the engine.

12. The method of claim 11, wherein the starter motor is driveably engageable with a ring gear fastened to a flywheel of the engine.

* * * * *